3,008,985
METHODS OF SYNTHESIZING 2-4-4-4 TETRACHLOROBUTYRIC ACID

Lucien Péras, Billancourt, France, assignor to Regie Nationale des Usines Renault, Billancourt, France, a French works
No Drawing. Filed Mar. 31, 1958, Ser. No. 724,853
Claims priority, application France Apr. 11, 1957
6 Claims. (Cl. 260—539)

As already demonstrated by recent research works made by the applicant, 2-4-4-4 tetrachlorobutyric acid constitutes a valuable adduct to lubricating oils. Now it is the essential object of this invention to provide an improved method of producing this acid on synthetic bases.

This novel method is characterized by three sequential chemical reactions, viz:

(1) Action of carbon tetrachloride on allyl acetate, which takes place according to the formula:

$$CCl_4 + CH_2=CH-CH_2-O-COCH_3 \rightarrow CCl_3-CH_2-CHCl-CH_2-O-CO-CH_3$$

(2-4-4-4 tetrachlorobutyl acetate)

(2) Action of methyl alcohol on tetrachlorobutyl acetate:

$$CCl_3-CH_2-CHCl-CH_2-O-COCH_3$$
$$+CH_3OH \rightarrow CCl_3-CH_2-CHCl$$
$$-CH_2OH+CH_3-CO-O-CH_3$$

(2-4-4-4 tetrachlorobutanol)

(3) oxidation of 2-4-4-4 tetrachlorobutanol:

$$3CCl_3-CH_2-CHCl-CH_2OH+4CrO_3 \rightarrow 3CCl_3-CH_2-CHCl-CO_2H+2Cr_2O_3+3H_2O$$

(2-4-4-4 tetrachlorobutyric acid)

Each of these three reactions has the following characteristic features:

I—FIXATION OF CARBON TETRACHLORIDE ON ALLYL ACETATE

It has already been attempted to mix carbon tetrachloride with allyl acetate and benzoyl peroxide, but only complex mixtures of polymerised products were obtained which had the general formula—

$$CCl_3-(CH_2-CH)_n-Cl$$
$$|$$
$$CH_2$$
$$|$$
$$O-CO-CH_3$$

but simple tetrachlorobutyl acetate $$CCl_3-CH_2-CHCl-CH_2-OCOCH_3$$

was not obtained.

Means have now been found whereby allyl acetate and carbon tetrachloride can be caused to react on each other to lead preponderantly to tetrachlorobutyl acetate.

According to this invention, the reagents are allowed to contact each other only very gradually throughout the reaction which must develop only at a very slow rate. Thus, on the one hand the allyl acetate and on the other hand the benzoyl peroxide dissolved in carbon tetrachloride are added dropwise to the carbon tetrachloride, so that the addition be completed only after 30 hours, which is the time required for the reaction to take place. During the reaction a small quantity of chloro 2 ($\beta\beta\beta$trichloroethyl) 4 pentane diol 1-5 diacetate having the formula $$CCl_3-CH_2-CH-CH_2-CHCl-CH_2OCOCH_3$$
$$|$$
$$CH_2$$
$$|$$
$$O-CO-CH_3$$

is obtained, but no other higher polymers develop.

Benzoyl peroxide or any other agent capable of releasing free radicals may be used as a catalyst. As free radicals, acetyl-, benzoyl-, lauroyl-, stearoyl-peroxides, hydroperoxides such as cumene, paracymene, tertiobutyl-, tertioamyl-hydroperoxides, and inorganic peroxidized compounds such as hydrogen peroxide, sodium peroxide, sodium perborate, potassium persulfate and alkaline percarbonates may be used. Ultra-violet light may also be used.

To obtain the highest yields the catalyst concentration with respect to the allyl acetate should range from 1% to 10% by weight.

To avoid the formation of polymers it is advantageous to use an excess of carbon tetrachloride relative to the allyl acetate which represents from 1 to 10 moles per mole. The reaction time is quite variable and depends on the quantities of reagents, on temperature and also on the type of catalysts utilized. The optimum yield is obtained by causing the reaction to take place at a temperature at which the decomposition of peroxide is immediate.

II—PASSAGE FROM TETRACHLOROBUTYL ACETATE TO TETRACLOROBUTANOL

Whereas alcoholysis reactions are reactions of equilibrium taking place with mean yields in most circumstances, this method is characterized by favourable conditions of equilibrium so that the yield of tetrachlorobutanol approximates 100%. Methyl-, ethyl- and isopropyl alcohols may be used to advantage. The equilibrium is markedly in favour of tetrachlorobutanol if a large excess of methanol, ethanol or isopropanol: 5 to 20 moles per mole of tetrachlorobutyl acetate is used. The reaction is characterized by a very small quantity of a strong acid such as hydrochloric, sulfuric or phosphoric acid. The highest yields are obtained when the catalyst concentration with respect to the tetrachlorobutanol acetate ranges from .001 to .1 mole per mole.

The reaction time is subordinate to the temperature at which the process is carried out. Any extended heating should be avoided as it would lead to a partial decomposition of the reagents. The most advantageous method consisting in dividing the operation into two steps, that is, a relatively long reaction effected at room temperature and followed by a shorter period of moderate heating to complete the reaction.

III—OXIDATION OF TETRACHLOROBUTANOL INTO TETRACHLOROBUTYRIC ACID

So far as the applicant is aware, the conventional method of oxidizing alcohols by using the acetochromic mixture was never applied to tetrachlorobutanol. Now it has been found that it permitted the easy production of 2-4-4-4 tetrachlorobutyric acid with relatively high yields.

Tetrachlorobutanol is oxidized by using an excess of chromic anhydride dissolved in acetic acid containing a small quantity of water. The obtaining of said is subordinate to four fundamental factors:

(1) Value of the excess of chromic anhydride utilized,
(2) Percentage of water in the acetic acid,
(3) Reaction temperature, and
(4) Reaction time.

It is possible to define relatively accurate limits for these factors; outside these limits, the oxidation will either not develop beyond the aldehyde, or lead to a deterioration of the product.

(i) An excess of chromic anhydride of from 25% to 100% must be used to keep the yield within reasonable limits. A greater excess would only mean a uselessly higher cost.

(ii) The quantity of water added to the acetic acid exerts a considerable influence on the reaction rate. In the absence of water, the oxidation conditions are too strong and the product is deteriorated. If the acid is over diluted the reaction is retarded considerably. Under practical conditions satisfactory results are obtained by adding from 5% to 30% of water in the acetic acid.

(iii) The reaction time is essentially a function of the quantity of water contained in the acetic acid. The reaction must be continued during at least 5 to 6 hours. It is not detrimental to extend the reaction time for a considerably longer period, provided that it is carried out at room temperature.

(iv) As the oxidation of tetrachlorobutanol is highly exothermic the reaction mixture must be strongly cooled when adding the chromic anhydride. The reaction product is then left at room temperature during the time necessary to the formation of tetrachlorobutyric acid. To shorten the reaction time the reaction mixture may be heated during one to two hours at a temperature of 30° to 40° C.

The following example illustrates the manner in which the method of this invention can be carried out in the practice.

*Example*

I—1,078 g. (7 moles) of dry carbon tetrachloride are placed in a 5-litre flask equipped with a condenser. Reflux heating is applied to the carbon tetrachloride. By using a bromine funnel 400 g. (4 moles) of freshly distilled allyl acetate (a) and a solution (b) of 32 g. (0.132 mole) of benzoyl peroxide in 2,002 g. (13 moles) of carbon tetrachloride are added dropwise. The rate of addition of (a) and (b) are so adjusted that the total duration of this addition is 30 hours. Then the reaction mixture is heated during half an hour under reflux conditions. Finally, the reaction mixture is a clear, very pale yellow liquid.

The fractional distillation of the reaction mixture yields the following results:

(A) Under ordinary pressure conditions, 2,330 g. of product having a B.P. lower than 80° C. and consisting for the greater part of carbon tetrachloride are collected.

(B) Under a pressure of 1 mm. Hg, 632 g. (62% of allyl acetate conversion) of 2-4-4-4 tetrachlorobutyl acetate distilling between 93° and 95° C., characterized by its index of refraction at 20° C. which is 1.4830, are collected. The elementary assay gives: C=29.16%, H=3.26%, O=11.13%, Cl=56.57% by weight.

(C) At the temperature of 133° C. and under a pressure of 1.5 mm. of Hg 147 g. (a 20% conversion of allyl acetate) of chloro 2-($\beta,\beta,\beta$-trichloroethyl) 4 pentane diol 1-5 diacetate, characterized by an index of refraction of 1.4860 at 20°, are collected.

II—A solution of 1,016 g. (4 moles) of tetrachlorobutyl acetate in 800 cc. of methanol (20 moles) in admixture with 16 cc. of concentrated hydrochloric acid (having a density of 1.19) is prepared. This solution is allowed to rest during 24 hours. The excess methanol and methyl acetate is evaporated in a water bath. The residue is dissolved again in 800 cc. of methanol in which 16 cc. of concentrated hydrochloric acid are added, and this solution is heated during two hours under reflux conditions. After the methanol has been eliminated, the residue is distilled in vacuo. Thus, 797 g. (94% of the theoretical quantity) of 2-4-4-4 tetrachlorobutanol, characterized by its boiling point at 74° C. under .5 mm. of Hg and by its index of refraction of 1.5068 at 20° C., are obtained. The elementary assay shows: C=24.10%, H=3.10%, O=8.71%, Cl=64.49% by weight.

III—250 g. (2.5 moles) of chromic anhydride dissolved in a mixture of 1,250 cc. of glacial acetic acid and 250 cc. of water are slowly added to a solution of 200 g. (.94 moles) of tetrachlorobutanol in 500 cc. of glacial acetic acid while constantly cooling and stirring the mixture. The mixture is then left at room temperature during 24 hours. Then an equal volume of water is added. The aqueous solution is extracted with ether. This ethereal extract is then washed with an aqueous solution of sodium bicarbonate. Thus, the tetrachlorobutyric acid can be separated by acidifying the carbonated solution, whereafter a fresh extraction with ether is effected. Finally, after removing the ether, the residue is distilled in vacuo. Thus, 110 g. (52% of the theoretical quantity) of 2-4-4-4 tetrachlorobutyric acid characterized by a B.P. of 105° to 109° C. at .5 mm. of Hg and its index of refraction of 1.4980 at 20° C., are obtained. The elementary assay gives, by weight, C=21.98%, H=2.10%, O=14.09%, Cl=61.93%.

I claim:

1. A process for the preparation of 2,4,4,4-tetrachlorobutyric acid from allyl acetate comprising the steps of contacting allyl acetate with an excess of carbon tetrachloride in the presence of a free-radical releasing catalyst to produce 2,4,4,4-tetrachlorobutyl acetate, contacting said acetate with an excess of an alcohol selected from the group consisting of methyl, ethyl, and isopropyl in the presence of a small quantity of strong mineral acid to produce tetrachlorobutanol, and exposing said tetrachlorobutanol to chromic oxidation to yield 2,4,4,4-tetrachlorobutyric acid.

2. A process for the preparation of 2,4,4,4-tetrachlorobutyric acid from allyl acetate comprising the steps of (1) reacting allyl acetate and carbon tetrachloride in the presence of a free radical-releasing catalyst, the reagents being gradually brought into contact with each other as the reaction takes place, the proportion of carbon tetrachloride being 1–10 moles per mole of allyl acetate and the proportion of catalyst being 1–10% by weight of the allyl acetate; (2) contacting the resultant 2,4,4,4-tetrachlorobutyl acetate with an excess of an alcohol selected from the group consisting of methyl, ethyl and isopropyl in the presence of 0.001 to 0.1 moles of a strong mineral acid per mole of said tetrachlorobutyl acetate; and (3) oxidizing the resulting 2,4,4,4-tetrachlorobutanol by contacting said tetrachlorobutanol with chromium anhydride in solution in a mixture of acetic acid and water, the chromic anhydride being in excess in the order of 25% to 100% and the proportion of the water being 5% to 30% of the acetic acid.

3. The process of claim 2 wherein said free radical-releasing catalyst is selected from the group consisting of organic peroxides, inorganic peroxides and ultraviolet light.

4. The process of claim 2 wherein said strong mineral acid is selected from the group consisting of hydrochloric, sulphuric and phosphoric acid.

5. The process of claim 2 wherein said third step is conducted for at least five hours.

6. The process of claim 3 wherein the reaction between said carbon tetrachloride and allyl acetate is carried out at a temperature at which decomposition of said peroxide is substantially immediate.

References Cited in the file of this patent

UNITED STATES PATENTS

| | | |
|---|---|---|
| 1,982,160 | Guinot | Nov. 27, 1934 |
| 2,353,160 | Hull | July 11, 1944 |
| 2,468,208 | Kharasch | Apr. 26, 1949 |
| 2,604,482 | Austerweil | July 22, 1952 |
| 2,950,300 | Brandon | Aug. 23, 1960 |

FOREIGN PATENTS

| | | |
|---|---|---|
| 565,476 | Germany | May 31, 1933 |
| 860,071 | France | Sept. 20, 1940 |

OTHER REFERENCES

Barker et al.: Chem. Eng. Progress Symp., Series 4, vol. 48 (1952), 260–638 (pp. 75–90, p. 75 relied on).

Noller: Chemistry of Organic Cpds., p. 545 (1951). (Copies in Sci. Library.)